United States Patent
Chae et al.

(10) Patent No.: US 7,609,661 B2
(45) Date of Patent: Oct. 27, 2009

(54) SYSTEM AND METHOD FOR CONTROLLING UPLINK TRAFFIC LOAD IN A CELLULAR WIRELESS MOBILE COMMUNICATION SYSTEM

(75) Inventors: Heon-Ki Chae, Seongnam-si (KR); Young-Hoon Kwon, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 582 days.

(21) Appl. No.: 11/356,821

(22) Filed: Feb. 16, 2006

(65) Prior Publication Data

US 2006/0209767 A1 Sep. 21, 2006

(30) Foreign Application Priority Data

Feb. 16, 2005 (KR) .................. 10-2005-0012727

(51) Int. Cl.
*H04B 7/00* (2006.01)
(52) U.S. Cl. .................. 370/310; 455/69; 455/522
(58) Field of Classification Search .......... 370/318, 370/335, 310; 455/522, 69
See application file for complete search history.

(56) References Cited

U.S. PATENT DOCUMENTS

| 6,021,125 | A  | * | 2/2000  | Sakoda et al. ........... 370/345 |
| 6,144,861 | A  | * | 11/2000 | Sundelin et al. ........ 455/522 |
| 6,334,047 | B1 | * | 12/2001 | Andersson et al. ....... 455/69  |
| 6,337,989 | B1 | * | 1/2002  | Agin .................. 455/522 |
| 6,754,496 | B2 | * | 6/2004  | Mohebbi et al. ........ 455/436 |
| 6,792,248 | B1 | * | 9/2004  | Naghian ............... 455/69  |
| 7,302,276 | B2 | * | 11/2007 | Bernhardsson et al. ... 455/522 |
| 2002/0141349 | A1 | * | 10/2002 | Kim et al. ............ 370/252 |
| 2003/0068984 | A1 | * | 4/2003  | Shin et al. ........... 455/69  |
| 2008/0039129 | A1 | * | 2/2008  | Li et al. ............. 455/522 |

OTHER PUBLICATIONS

Rashid-Farrokhi, Tassiulas, Liu, "Joint Optimal Power Control and Beamforming in Wireless Networks Using Antenna Arrays", Oct. 1998, IEEE Transactions on Communications, vol. 46 : 1313-1324.*

* cited by examiner

*Primary Examiner*—Ayaz R Sheikh
*Assistant Examiner*—Tarell Hampton
(74) *Attorney, Agent, or Firm*—The Farrell Law Firm, LLP

(57) ABSTRACT

A method is provided for controlling an uplink traffic load in a wireless mobile communication system. A mobile station (MS) receives a reference signal from each of a base station (BS) of its home cell and a BS of a neighbor cell; calculates a power difference between the received reference signals to estimate a path loss value for each individual BS, and reports the estimated path loss value to the BS of the home cell. The BS of the home cell receives the estimated path loss value for each individual BS from the MS; and determines and allocates uplink traffic transmission power and a data rate to the MS taking the estimated path loss value into consideration. The MS transmits an uplink traffic signal taking into account the uplink traffic transmission power and the data rate allocated from the BS of the home cell.

15 Claims, 3 Drawing Sheets

SYSTEM AND METHOD FOR CONTROLLING UPLINK TRAFFIC LOAD IN A CELLULAR WIRELESS MOBILE COMMUNICATION SYSTEM

PRIORITY

This application claims the benefit under 35 U.S.C. §119 (a) of an application entitled "System and Method for Controlling Uplink Traffic Load in a Cellular Wireless Mobile Communication System" filed in the Korean Intellectual Property Office on Feb. 16, 2005 and assigned Serial No. 2005-12727, the entire contents of which are incorporated herein by reference.

BACKGROUND OF THE INVENTION

1. Field of the Invention

The present invention relates generally to a wireless mobile communication system having a cellular structure (hereinafter referred to as a "cellular wireless mobile communication system"), and in particular, to a system and method for controlling an uplink traffic load.

2. Description of the Related Art

In general, the performance and capacity of a wireless mobile communication system are limited by wireless propagation channel characteristics such as co-channel interference, path loss and multipath fading, occurring between cells or in a cell. Technologies for compensating for the performance and capacity limitations include power control, channel coding, rake reception and diversity antenna technologies.

In a cellular wireless mobile communication system, a plurality of mobile stations (MSs) located in one cell perform wireless communication with a base station (BS) that manages the cell. Therefore, the BS receives uplink signals from each of the MSs. In this case, a signal transmitted by a particular MS may act as an interference component to a signal transmitted by another MS. In addition, if the signal transmitted by the particular MS is high in power, it acts as a high-interference component to the signal transmitted by another MS. Therefore, in the wireless mobile communication system, uplink power control for an MS should necessarily be performed in order for a BS to stably receive signals from MSs.

In the conventional Code Division Multiple Access (CDMA)-based cellular wireless mobile communication system, a BS performs uplink power control for an MS, using a Rise-Over-Thermal (ROT) index. The term "ROT" as used herein refers to a ratio of a value obtained by adding a thermal noise to a sum of signal powers to the thermal noise, and the BS can analyze uplink loading conditions based on the ROT index. The ROT can be represented by Equation (1):

$$ROT = \frac{NS + \eta}{\eta} = \frac{NS}{\eta} + 1 \quad (1)$$

In Equation (1), the ROT is defined on the assumption that one of a plurality of possible cells does not suffer interference from its neighbor cells, N MSs are using the same service, and uplink signal power for each of the N MSs is fully controlled by a signal S. In Equation (1), $\eta$ denotes thermal noise power.

If all MSs located in the cell are power-controlled in a required signal-to-noise ratio $(E_C/I_O)_{req}$, the $(E_C/I_O)_{req}$ can be represented by Equation (2):

$$\left(\frac{E_C}{I_O}\right)_{req} = \frac{S}{(N-1)S + \eta} \quad (2)$$

$$\cong \frac{S}{NS + \eta}$$

In Equation (2), received power S for each of MSs can be expressed as Equation (3):

$$S = (E_C/I_O)_{req}(NS + \eta) \quad (3)$$

$$= \frac{\eta(E_C/I_O)_{req}}{1 - N(E_C/I_O)_{req}}$$

Using Equation (3), Equation (1) can be re-written as Equation (4):

$$ROT = \frac{NS}{\eta} + 1 \quad (4)$$

$$= \frac{N}{\eta} \cdot \frac{\eta(E_C/I_O)_{req}}{1 - N(E_C/I_O)_{req}} + 1$$

$$= \frac{1}{1 - N(E_C/I_O)_{req}}$$

In accordance with Equation (4), pole capacity indicating the theoretical uplink maximum capacity in the ideal cell environment with no power control and thermal noise can be represented by Equation (5):

$$N_{max} = \frac{1}{(E_C/I_O)_{req}} \quad (5)$$

Therefore, the ROT of Equation (4) in accordance with Equation (5) can be re-written as Equation (6):

$$ROT = \frac{1}{1 - N/N_{max}} \quad (6)$$

FIG. 1 is a graph illustrating a variation in ROT with respect to an increase in uplink traffic in a common CDMA communication system. As illustrated in FIG. 1, the ROT is a factor indicating a ratio of the current load to the system pole capacity, and a BS controls an uplink load according to the ROT. After measuring the ROT, the BS broadcasts the measured ROT value to its MSs, and an MS receiving the measured ROT value determines its data rate and transmission power according to the received ROT value.

However, the conventional CDMA-based wireless mobile communication system provides that every MS periodically stops its transmission for a predetermined time in order that a BS may measure the thermal noise power $\eta$ in an idle state and then measure an ROT in a normal call state. That is, the conventional MSs cannot transmit uplink signals to the BS for a specific time, even though it is for a very short time. In addition, the method of controlling an uplink traffic load using the ROT index cannot be applied to a multi-carrier communication system. Therefore, there is a need for a scheme for controlling an uplink traffic load in the multi-carrier communication system.

SUMMARY OF THE INVENTION

It is, therefore, an object of the present invention to provide a system and method for controlling an uplink traffic load by a BS in a wireless mobile communication system.

According to one aspect of the present invention, there is provided a method for controlling an uplink traffic load by a mobile station (MS) in a wireless mobile communication system having a multi-cell configuration in which a full frequency band is divided into a plurality of sub-frequency bands and a neighbor cell reuses one of the divided sub-frequency bands. The method includes receiving a reference signal from each of a base station (BS) of a home cell to which the MS belongs and a BS of a neighbor cell; calculating a power difference between the received reference signals to estimate a path loss value for each individual BS, and reporting the estimated path loss value to the BS of the home cell; and transmitting an uplink traffic signal taking into account uplink traffic transmission power and a data rate allocated from the BS of the home cell.

According to another aspect of the present invention, there is provided a method for controlling an uplink traffic load by a base station (BS) in a wireless mobile communication system having a multi-cell configuration in which a full frequency band is divided into a plurality of sub-frequency bands and a neighbor cell reuses one of the divided sub-frequency bands. The method includes receiving an estimated path loss value for each individual BS from a mobile station (MS); determining uplink traffic transmission power and a data rate to be allocated to the MS taking the estimated path loss value into consideration; and allocating the determined uplink traffic transmission power and data rate to the MS.

According to further another aspect of the present invention, there is provided a method for controlling an uplink traffic load in a wireless mobile communication system having a multi-cell configuration in which a full frequency band is divided into a plurality of sub-frequency bands and a neighbor cell reuses one of the divided sub-frequency bands. The method includes receiving, by a mobile station (MS), a reference signal from each of a base station (BS) of a home cell to which the MS belongs and a BS of a neighbor cell; calculating a power difference between the received reference signals to estimate a path loss value for each individual BS, and reporting the estimated path loss value to the BS of the home cell; receiving, by the BS of the home cell, the estimated path loss value for each individual BS from the MS; determining uplink traffic transmission power and a data rate to be allocated to the MS taking the estimated path loss value into consideration; allocating the determined uplink traffic transmission power and data rate to the MS; and transmitting, by the MS, an uplink traffic signal taking into account the uplink traffic transmission power and the data rate allocated from the BS of the home cell.

According to yet another aspect of the present invention, there is provided a method for controlling an uplink traffic load of a mobile station (MS) located in a cell using a Space Division Multiple Access (SDMA) scheme in a wireless mobile communication system having a multi-cell configuration in which a full frequency band is divided into a plurality of sub-frequency bands, a neighbor cell reuses one of the divided sub-frequency bands, and any one of a plurality of cells uses SDMA. The method includes receiving, by the MS, a reference signal from each of a base station (BS) of a home cell to which it belongs and a BS of a neighbor cell; calculating a power difference between the received reference signals to estimate a path loss value for each individual BS, and reporting the estimated path loss value to the BS of the home cell; receiving, by the BS of the home cell, the estimated path loss value for each individual BS from the MS; determining uplink traffic transmission power and a data rate to be allocated to the MS taking into account the estimated path loss value and an antenna gain value; allocating the determined uplink traffic transmission power and data rate to the MS; and transmitting, by the MS, an uplink traffic signal taking into account the uplink traffic transmission power and the data rate allocated from the BS of the home cell.

According to still another aspect of the present invention, there is provided a method for controlling an uplink traffic load by a mobile station (MS) located in a cell using a Space Division Multiple Access (SDMA) scheme in a wireless mobile communication system having a multi-cell configuration in which a full frequency band is divided into a plurality of sub-frequency bands, a neighbor cell reuses one of the divided sub-frequency bands, and any one of a plurality of cells uses SDMA. The method includes receiving a reference signal from each of a base station (BS) of a home cell to which the MS belongs and a BS of a neighbor cell; calculating a power difference between the received reference signals to estimate a path loss value for each individual BS, and reporting the estimated path loss value to the BS of the home cell; and transmitting an uplink traffic signal taking into account uplink traffic transmission power and a data rate allocated from the BS of the home cell.

According to still another aspect of the present invention, there is a method for controlling an uplink traffic load by a base station (BS) located in a cell using a Space Division Multiple Access (SDMA) scheme in a wireless mobile communication system having a multi-cell configuration in which a full frequency band is divided into a plurality of sub-frequency bands, a neighbor cell reuses one of the divided sub-frequency bands, and any one of a plurality of cells uses SDMA. The method included receiving an estimated path loss value for each individual BS from a mobile station (MS); determining uplink traffic transmission power and a data rate to be allocated to the MS taking into account the estimated path loss value and an antenna gain value for each individual transmission antenna; and allocating the determined uplink traffic transmission power and data rate to the MS.

According to still another aspect of the present invention, there is provided a system for controlling an uplink traffic load in a wireless mobile communication system having a multi-cell configuration in which a full frequency band is divided into a plurality of sub-frequency bands and a neighbor cell reuses one of the divided sub-frequency bands. The system includes a mobile station (MS) for receiving a reference signal from each of a base station (BS) of a home cell to which the MS belongs and a BS of a neighbor cell, calculating a power difference between the received reference signals to estimate a path loss value for each individual BS, reporting the estimated path loss value to the BS of the home cell, and transmitting an uplink traffic signal taking into account uplink traffic transmission power and a data rate allocated from the BS of the home cell; and the BS for receiving the estimated path loss value for each individual BS from the MS, determining uplink traffic transmission power and a data rate to be allocated to the MS taking the estimated path loss value into consideration, and allocating the determined uplink traffic transmission power and data rate to the MS.

According to still another aspect of the present invention, there is provided a system for controlling an uplink traffic load in a wireless mobile communication system having a multi-cell configuration in which a full frequency band is divided into a plurality of sub-frequency bands, a neighbor cell reuses one of the divided sub-frequency bands, and any one of a plurality of cells uses a Space Division Multiple Access (SDMA) scheme. The system includes a mobile station (MS) for receiving a reference signal from each of a base station (BS) of a home cell to which the MS belongs and a BS of a neighbor cell, calculating a power difference between the received reference signals to estimate a path loss value for each individual BS, reporting the estimated path loss value to the BS of the home cell, and transmitting an uplink traffic signal taking into account uplink traffic transmission power and a data rate allocated from the BS of the home cell; and the BS for receiving the estimated path loss value for each individual BS from the MS, determining uplink traffic transmission power and a data rate to be allocated to the MS taking into account the estimated path loss value and an antenna gain value for each individual transmission antenna, and allocating the determined uplink traffic transmission power and data rate to the MS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EXEMPLARY EMBODIMENTS

Exemplary embodiments of the present invention will now be described in detail with reference to the annexed drawings. In the following description, a detailed description of known functions and configurations incorporated herein has been omitted for clarity and conciseness.

The present invention provides a scheme for minimizing an interference signal to neighbor cells by effectively controlling an uplink traffic load by a BS in a cellular wireless communication system. In addition, the present invention provides a scheme for minimizing an interference signal to neighbor cells by effectively controlling an uplink traffic load by a BS in a Space Division Multiple Access (SDMA) cellular wireless mobile communication system using a beamforming technique.

For that purpose, it will be assumed in a first embodiment of the present invention that a multi-cell configuration is provided and a particular sub-channel used in one cell is reused in neighbor cells. For example, portable Internet (or Wireless Broadband (WiBro)) using a 2.3 GHz band can use a Band-Adaptive Modulation and Coding (Band-AMC) scheme. The Band-AMC scheme transmits/receives high-capacity data at a high rate by applying a high-coding efficiency modulation technique when reception quality is high. In one cell using the Band-AMC scheme, sub-channels in different bands are allocated to MSs, causing no interference between the MSs. However, when the same sub-channel in the same band is used in neighbor cells, signals from MSs using the sub-channel may act as interference to each other.

Currently, the WiBro standard gives no definition of an interval for which data is not exchanged between a BS and an MS. Therefore, the BS cannot use the conventional method of performing power control using an ROT index.

According to the present invention, an MS calculates path loss using preamble signals received from each BS and then reports the calculated path loss to the BS.

Figure 1:
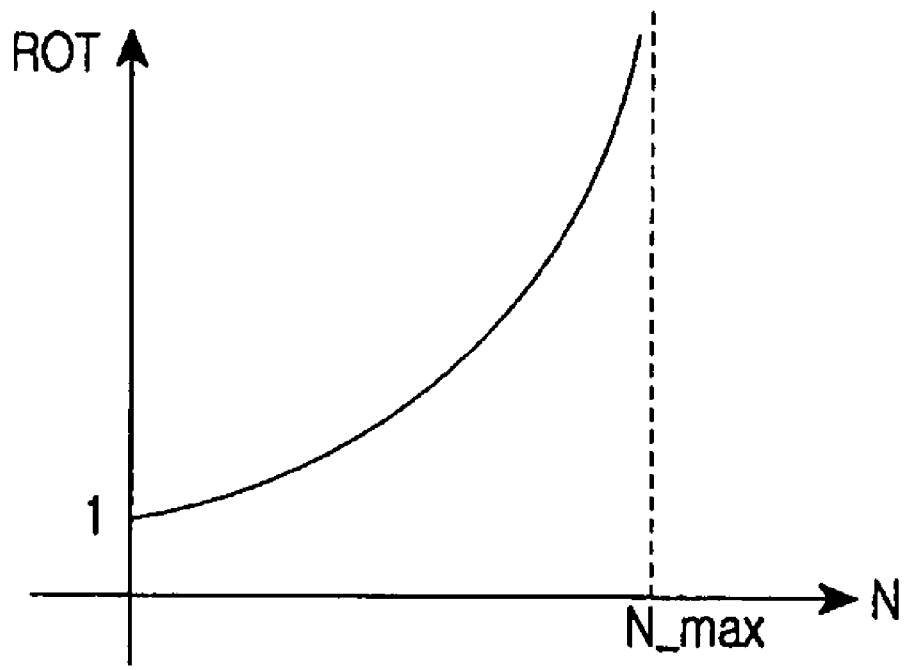
FIG. 1 is a graph illustrating a variation in ROT with respect to an increase in uplink traffic in a common CDMA communication system.
Figure 2:
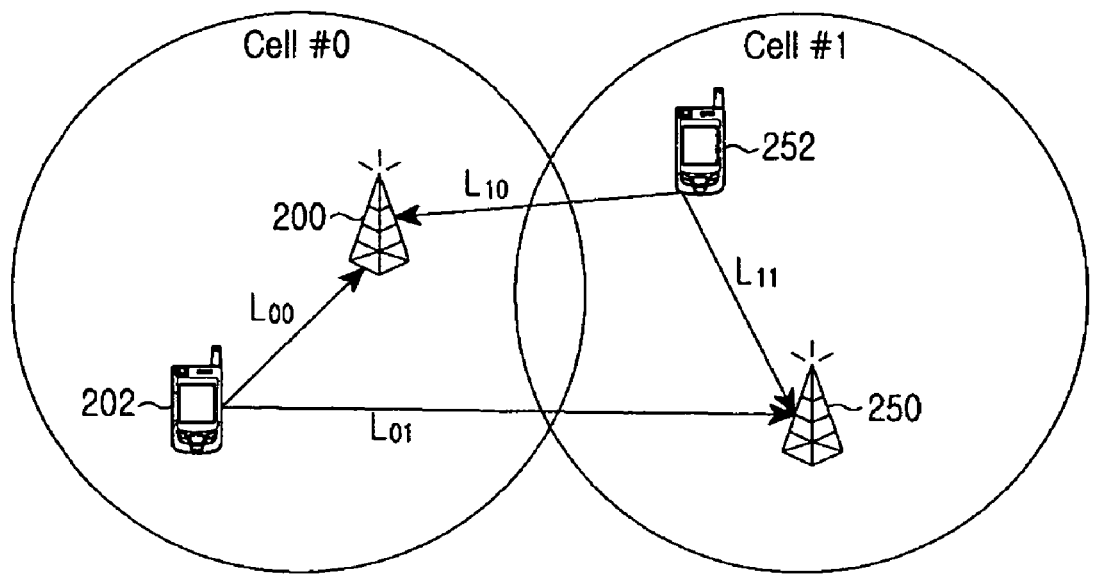
FIG. 2 is a diagram illustrating a path loss that an MS experiences according to a first embodiment of the present invention.

FIG. 2 is a diagram illustrating a path loss that an MS experiences according to a first embodiment of the present invention.

Referring to FIG. 2, an MS 202 receives a preamble signal transmitted by a BS 200 of its cell Cell#0 and a preamble signal transmitted by a BS 250 of a neighbor cell Cell#1, and measures a carrier-to-interference ratio (CIR) for each of the preamble signals. In FIG. 2, $L_{ij}$ denotes a path loss of an MS belonging to an $i^{th}$ BS, for a $j^{th}$ BS.

As assumed above, the number of MSs using the same sub-channel in the same band, located in neighbor cells, is defined as N. Thus, a required CIR of an MS for an $i^{th}$ BS can be calculated by Equation (7):

$$\gamma_i = \frac{P_i L_{ii}}{\sum_{k=1, k\neq i}^{N} P_k L_{ki} + \eta} \qquad (7)$$

In Equation (7), $P_i$ denotes power transmitted by an MS belong to an $i^{th}$ BS, and $\eta$ denotes thermal noise power. Equation (7) can be expressed as an $N^{th}$-order simultaneous equation defined by Equation (8):

$$\frac{L_{ii}}{\gamma_i} P_i - \sum_{k\neq i} L_{ki} P_k = \eta \qquad (8)$$

$$\begin{bmatrix} \frac{L_{00}}{\gamma_0} & -L_{10} & -L_{20} & \cdots & -L_{N0} \\ -L_{01} & \frac{L_{11}}{\gamma_1} & -L_{21} & \cdots & -L_{N1} \\ \vdots & \vdots & \vdots & \ddots & \vdots \\ -L_{0N} & -L_{1N} & -L_{2N} & \cdots & \frac{L_{NN}}{\gamma_N} \end{bmatrix} \begin{bmatrix} P_0 \\ P_1 \\ \vdots \\ P_N \end{bmatrix} = \begin{bmatrix} \eta \\ \eta \\ \vdots \\ \eta \end{bmatrix}$$

For N=1, i.e., for the case where an MS in a home cell receives an interference signal caused by one MS located in any one of neighbor cells, Equation (8) can be re-written as Equation (9):

$$\begin{bmatrix} \frac{L_{00}}{\gamma_0} & -L_{10} \\ -L_{01} & \frac{L_{11}}{\gamma_1} \end{bmatrix} \begin{bmatrix} P_0 \\ P_1 \end{bmatrix} = \begin{bmatrix} \eta \\ \eta \end{bmatrix} \qquad (9)$$

For $P_0$ and $P_1$, Equation (9) can be re-written as Equation (10):

$$P_0 = \frac{(\gamma_1 L_{10} + L_{11})\gamma_0}{L_{00}L_{11} - \gamma_0\gamma_1 L_{10}L_{01}}\eta \quad (10)$$

$$P_1 = \frac{(\gamma_0 L_{01} + L_{00})\gamma_1}{L_{00}L_{11} - \gamma_0\gamma_1 L_{10}L_{01}}\eta$$

Using Equation (10), a condition on which transmission power of each MS is higher than 0 and does not diverge is given as $L_{00}L_{11} - \gamma_0\gamma_1 L_{10}L_{01} > 0$. This can be re-written as $$\gamma_0\gamma_1 < \frac{L_{00}}{L_{01}} \cdot \frac{L_{11}}{L_{10}}$$

for a required CIR of an MS.

Therefore, the BS allocates uplink power to an MS in an $i^{th}$ cell such that a condition of Equation (11) below is satisfied, and determines a data rate for uplink transmission and then notifies the MS of the determined data rate.

$$\gamma_i < \frac{L_{ii}}{L_{ij}} \quad (11)$$

Equation (11) represents a range of a CIR required by an MS, and the BS can control the required CIR below a ratio of a path loss of a home cell to a path loss of a neighbor cell to minimize a system loading rate, thereby contributing to system stabilization.

Similarly, for N=2, an $r_i$ value can be determined in Equation (12) as follows.

$$\frac{L_{01}L_{10}L_{22}}{\gamma_2} + \frac{L_{12}L_{21}L_{00}}{\gamma_0} + \frac{L_{02}L_{20}L_{11}}{\gamma_1} + \quad (12)$$

$$L_{10}L_{21}L_{02} + L_{01}L_{12}L_{20} - \frac{L_{00}L_{11}L_{22}}{\gamma_0\gamma_1\gamma_2} < 0$$

An $r_i$ value satisfying Equation (12) can be determined by Equation (13):

$$\gamma_i < \frac{L_{ii}}{\sum_{j \neq i} L_{ij}} \quad (13)$$

That is, Equation (13) means that the system can be stabilized by setting a CIR required by an MS in each cell to a value below a ratio of a path loss of a home cell to a sum of path losses of neighbor cells.

Similarly, for N=3 or above, an $r_i$ value can also be determined by Equation (12) and Equation (13).

As described above, an MS reports an estimated path loss value to a BS, and the BS can determine uplink transmission power $P_i$ and a required CIR $r_i$ of the MS using the estimated path loss value received from the MS.

Figure 3:
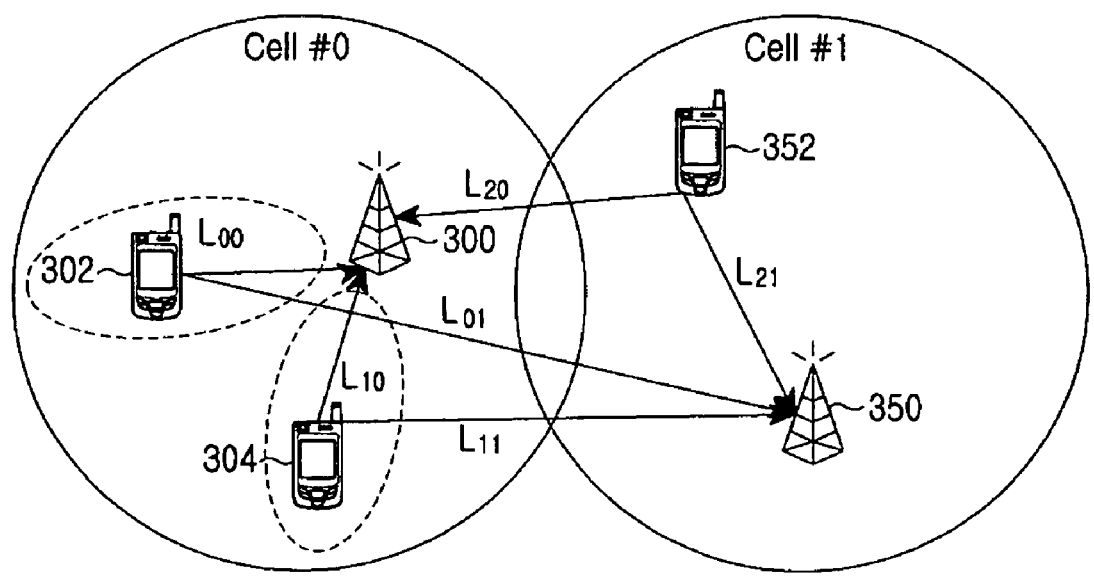
FIG. 3 is a diagram illustrating a path loss that an MS experiences in an SDMA wireless mobile communication system according to a second embodiment of the present invention.

A description will now be made of a method for controlling an uplink traffic load in an SDMA wireless mobile communication system according to a second embodiment of the present invention. FIG. 3 is a diagram illustrating a path loss that an MS experiences in an SDMA wireless mobile communication system.

Before a description of FIG. 3 is given, it should be noted that SDMA, which is a multiple beam frequency reuse scheme, divides the space using directional antennas to efficiently use the same frequency and directs antenna beams to the individual divided spaces, thereby reusing the frequency. Even the use of the directional antennas cannot prevent interference signals from being received from neighbor cells.

Referring to FIG. 3, a BS 300 of Cell#0 performs SDMA communication with its MSs 302 and 304. However, a BS 350 of Cell#1 does not use SDMA. In FIG. 3, $L_{ij}$ denotes a path loss that a signal of an $i^{th}$ MS experiences while it reaches a $j^{th}$ BS.

An $r_i$ value indicating a CIR required by each MS in Cell#0 and Cell#1 can be calculated by Equation (14):

$$\gamma_0 = \frac{P_0 L_{00} G_{00}}{P_1 G_{01} L_{10} + P_2 G_{02} L_{20} + \eta} \quad (14)$$

$$\gamma_1 = \frac{P_1 L_{10} G_{11}}{P_0 G_{10} L_{00} + P_2 G_{12} L_{20} + \eta}$$

$$\gamma_2 = \frac{P_2 L_{21} G}{P_0 G L_{01} + P_1 G L_{11} + \eta}$$

In Equation (14), $G_{ij}$ denotes a gain of an antenna facing a $j^{th}$ MS for the case where SDMA is used, i.e., for the case where the BS 300 transmits signals towards an $i^{th}$ MS using the beamforming technique in Cell#0, and G denotes a gain of an antenna for the case where SDMA is not used, i.e., for the case where the BS 350 transmits signals in all directions in Cell#1.

Equation (14) can be developed with respect to $P_0$, $P_1$ and $P_2$, deriving therefrom a triharmonic $1^{st}$-order simultaneous equation given as Equation (15):

$$G_{00}L_{00}P_0 - \gamma_0 G_{01}L_{10}P_1 - \gamma_0 G_{02}L_{20}P_2 = \gamma_0 \eta$$

$$-\gamma_1 G_{10}L_{00}P_0 + G_{11}L_{10}P_1 - \gamma_1 G_{12}L_{20}P_2 = \gamma_1 \eta$$

$$-\gamma_2 G L_{01}P_0 - \gamma_2 G L_{11}P_1 + G L_{21}P_2 = \gamma_2 \eta \quad (15)$$

In Equation (15), $P_2$ can be expressed with $P_0$ and $P_1$ as a biharmonic $1^{st}$-order simultaneous equation for $P_0$ and $P_1$ in Equation (16) as follows.

$$\left(-\gamma_1 G_{10}L_{00} - \gamma_1\gamma_2 G_{12}\frac{L_{20}L_{01}}{L_{21}}\right)P_0 + \left(G_{11}L_{10} - \gamma_1\gamma_2 G_{12}\frac{L_{20}L_{11}}{L_{21}}\right)P_1 = \quad (16)$$

$$\left(\gamma_1\gamma_2 \frac{G_{12}L_{20}}{GL_{21}} + \gamma_1\right)\eta\left(G_{00}L_{00} - \gamma_0\gamma_2 G_{02}\frac{L_{20}L_{01}}{L_{21}}\right)P_0 +$$

$$\left(-\gamma_0 G_{01}L_{10} - \gamma_0\gamma_2 G_{02}\frac{L_{20}L_{11}}{L_{21}}\right)P_1 = \left(\gamma_0\gamma_2 \frac{G_{02}L_{20}}{GL_{21}} + \gamma_0\right)\eta$$

Meanwhile, a stabilization condition of Equation (16) is determined by a determinant converted from Equation (16), and should satisfy Equation (17) below.

$$\left(-\gamma_1 G_{10}L_{00} - \gamma_1\gamma_2 G_{12}\frac{L_{20}L_{01}}{L_{21}}\right)\left(-\gamma_0 G_{01}L_{10} - \gamma_0\gamma_2 G_{02}\frac{L_{20}L_{11}}{L_{21}}\right) - \quad (17)$$

$$\left(\gamma_1\gamma_2 \frac{G_{12}L_{20}}{GL_{21}} + \gamma_1\right)\left(G_{00}L_{00} - \gamma_0\gamma_2 G_{02}\frac{L_{20}L_{01}}{L_{21}}\right) > 0$$

In order to simplify Equation (17), it will be assumed that there is no mutual interference between MSs in the cell using SDMA. In other words, there is no mutual interference between MS 302 and MS 304 of FIG. 3, and this can be expressed as $G_{10}=G_{01}=0$. Accordingly, the stabilization condition can be represented by Equation (18):

$$\gamma_0\gamma_2 G_{02}G_{11}\frac{L_{10}L_{20}L_{01}}{L_{21}} + \gamma_1\gamma_2 G_{12}G_{00}\frac{L_{00}L_{20}L_{11}}{L_{21}} < G_{00}G_{11}L_{00}L_{10} \therefore \quad (18)$$

$$\left(\gamma_0\frac{G_{02}}{G_{00}}\frac{L_{01}}{L_{00}} + \gamma_1\frac{G_{12}}{G_{11}}\frac{L_{11}}{L_{10}}\right) \times \gamma_2\frac{L_{20}}{L_{21}} < 1$$

Equation (18), when it is applied to every cell, can be represented by Equation (19):

$$\left(\gamma_0\frac{G_{02}}{G_{00}}\frac{L_{01}}{L_{00}} + \gamma_1\frac{G_{12}}{G_{11}}\frac{L_{11}}{L_{10}}\right) < 1 \quad (19)$$

$$\gamma_2\frac{L_{20}}{L_{21}} < 1$$

That is, a CIR value to be allocated to an MS 352 is limited to a difference in the path between the home cell Cell#1 and the neighbor cell Cell#0 of the MS 352. As a sufficient condition for the MS 302 and the MS 304 managed by the BS 300, Equation (20) below can be applied to each individual MS.

$$\gamma_0\frac{G_{02}}{G_{00}}\frac{L_{01}}{L_{00}} < p \quad (20)$$

$$\gamma_1\frac{G_{12}}{G_{11}}\frac{L_{11}}{L_{10}} < q = 1-p$$

In Equation (20), p and q denote power allocation proportional constants for the MS 304 and the MS 352. For example, a channel quality information (CQI) value that the BS receives can be an example of the constants.

Equation (20), when it is extended to a system having 3 or more cells, can be represented by Equation (21):

$$\gamma_0 < p\frac{G_{00}L_{00}}{\sum G_{0x}L_{0x}} \quad (21)$$

$$\gamma_1 < (1-p)\frac{G_{11}L_{10}}{\sum G_{1x}L_{1x}}$$

Therefore, in the SDMA system, a BS limits a CIR value allocated to each individual MS in proportion to a path loss difference determined by taking an antenna gain value into consideration, and maintains the sum of proportional constants for all MSs at 1, resulting in stabilization of the system.

Figure 4:
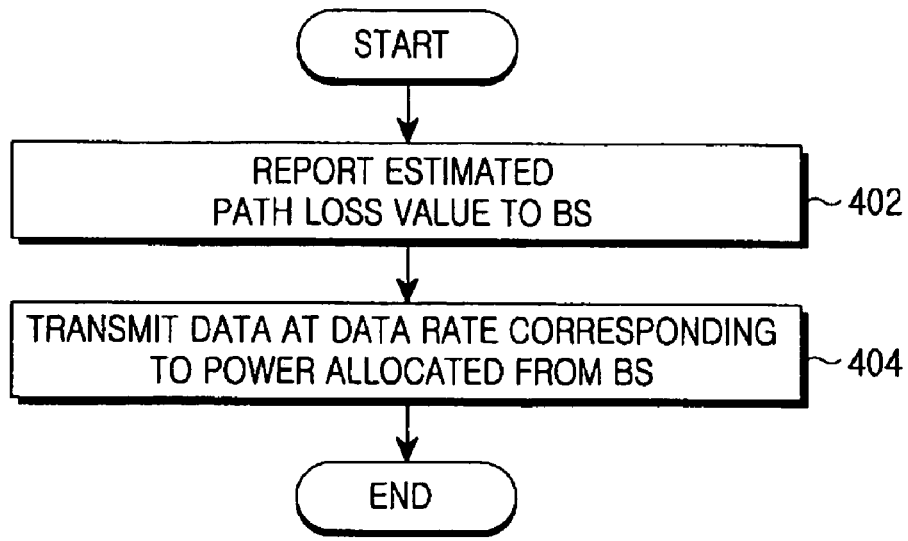
FIG. 4 is a flowchart illustrating an uplink traffic load control process performed by an MS according to the present invention.

FIG. 4 is a flowchart illustrating an uplink traffic load control process performed by an MS according to the present invention.

Referring to FIG. 4, an MS measures, in step 402, CIRs of a preamble received from a BS of its home cell and a preamble received from a BS of a neighbor cell, and measures a path loss using a difference between the CIR values measured for the individual cells. The MS reports the estimated path loss value to its BS and then proceeds to step 404. In step 404, the MS transmits data to the BS at a data rate corresponding to uplink power allocated from the BS.

Figure 5:
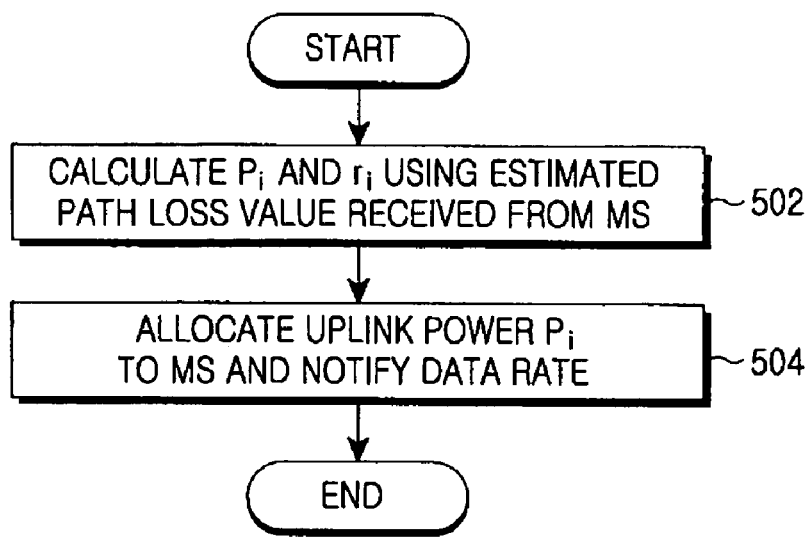
FIG. 5 is a flowchart illustrating an uplink traffic load control process performed by a BS according to the present invention.

FIG. 5 is a flowchart illustrating an uplink traffic load control process performed by a BS according to the present invention.

Referring to FIG. 5, a BS calculates, in step 502, $P_i$ and $r_i$ values using the estimated path loss value received from the MS. The BS allocates, in step 504, uplink power corresponding to the $P_i$ value to an MS and notifies a data rate for the uplink data traffic to be transmitted by the MS.

As can be understood from the foregoing description, when an MS of a home cell uses a particular frequency band and another MS reuses the particular frequency band in a neighbor cell, each of the MSs estimates a path loss value to a BS of the home cell and a path loss value to a BS of the neighbor cell and reports the estimated path loss values to a BS, and the BS sets uplink traffic power of the MSs to a value lower than a ratio of the path loss value to the BS of the home cell to a sum of path loss values to BSs of the neighbor cells before allocating the uplink traffic power to the MSs, thereby contributing to minimization of collision between frequencies due to the frequency reuse and a system loading rate. In addition, the SDMA system also controls uplink traffic power such that the uplink traffic power of an MS is limited in proportion to a ratio of a path loss value to a BS of a home cell to a sum of path losses determined taking into account gains of antennas facing all neighbor cells and a sum of proportional constants for all MSs is maintained at 1, thereby contributing to minimization of collision between frequencies due to the frequency reuse and a system loading rate.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for controlling an uplink traffic load by a mobile station (MS) in a wireless mobile communication system having a multi-cell configuration in which a full frequency band is divided into a plurality of sub-frequency bands and a neighbor cell reuses one of the divided sub-frequency bands, the method comprising the steps of:

receiving a reference signal from each of a base station (BS) of a home cell to which the MS belongs and a BS of a neighbor cell;

calculating a power difference between the received reference signals to estimate a path loss value for each individual BS, and reporting the estimated path loss value to the BS of the home cell; and transmitting an uplink traffic signal, taking into account uplink traffic transmission power and a data rate allocated from the BS of the home cell;

wherein the allocated uplink traffic transmission power satisfies $$\gamma_i < \frac{L_{ii}}{\sum_{j \neq i} L_{ij}}$$

and is determined by $$P_0 = \frac{(\gamma_1 L_{10} + L_{11})\gamma_0}{L_{00}L_{11} - \gamma_0\gamma_1 L_{10}L_{01}}\eta$$

$$P_1 = \frac{(\gamma_0 L_{01} + L_{00})\gamma_1}{L_{00}L_{11} - \gamma_0\gamma_1 L_{10}L_{01}}\eta$$

where $\gamma_i$ denotes a carrier-to-interference ratio (CIR) for an MS of an $i^{th}$ BS, $L_{ab}$ denotes a path loss value of an MS located in an $a^{th}$ BS for a $b^{th}$ BS, $P_A$ denotes uplink traffic transmission power for an MS of an $A^{th}$ BS, and $\eta$ denotes thermal noise power.

2. The method of claim 1, wherein the MS receives preamble signals from at least two BSs and estimates path loss values according thereto.

3. A method for controlling an uplink traffic load by a base station (BS) in a wireless mobile communication system having a multi-cell configuration in which a full frequency band is divided into a plurality of sub-frequency bands and a neighbor cell reuses one of the divided sub-frequency bands, the method comprising the steps of:

receiving an estimated path loss value for each individual BS from a mobile station (MS);

determining uplink traffic transmission power and a data rate to be allocated to the MS, taking the estimated path loss value into consideration; and allocating the determined uplink traffic transmission power and data rate to the MS;

wherein the uplink traffic transmission power to be allocated to the MS is determined taking into account a data rate determined to be lower than a ratio of an estimated path loss value for each individual BS and an estimated path loss value to a home BS, received from the MS, to a sum of estimated path loss values to neighbor BSs, and is defined as $$P_0 = \frac{(\gamma_1 L_{10} + L_{11})\gamma_0}{L_{00}L_{11} - \gamma_0\gamma_1 L_{10}L_{01}}\eta$$

$$P_1 = \frac{(\gamma_0 L_{01} + L_{00})\gamma_1}{L_{00}L_{11} - \gamma_0\gamma_1 L_{10}L_{01}}\eta$$

where $\gamma_i$ denotes a carrier-to-interference ratio (CIR) for an MS of an $i^{th}$ BS, $L_{ab}$ denotes a path loss value of an MS located in an $a^{th}$ BS for a $b^{th}$ BS, $P_A$ denotes uplink traffic transmission power for an MS of an $A^{th}$ BS, and $\eta$ denotes thermal noise power.

4. The method of claim 3, wherein the received estimated path loss value is determined using a power difference between preambles received from a home BS to which the MS belongs and a BS of a neighbor cell.

5. The method of claim 4, wherein the data rate is defined as $$\gamma_i < \frac{L_{ii}}{\sum_{j \neq i} L_{ij}}$$

where $\gamma_i$ denotes a carrier-to-interference ratio (CIR) for an MS of $i^{th}$ BS, and $L_{ab}$ denotes a path loss value of an MS located in an $a^{th}$ BS for a $b^{th}$ BS.

6. A method for controlling an uplink traffic load in a wireless mobile communication system having a multi-cell configuration in which a full frequency band is divided into a plurality of sub-frequency bands and a neighbor cell reuses one of the divided sub-frequency bands, the method comprising the steps of:

receiving, by a mobile station (MS), a reference signal from each of a base station (BS) of a home cell to which the MS belongs and a BS of a neighbor cell;

calculating a power difference between the received reference signals to estimate a path loss value for each individual BS, and reporting the estimated path loss value to the BS of the home cell;

receiving, by the BS of the home cell, the estimated path loss value for each individual BS from the MS;

determining uplink traffic transmission power and a data rate to be allocated to the MS taking the estimated path loss value into consideration;

allocating the determined uplink traffic transmission power and data rate to the MS; and transmitting, by the MS, an uplink traffic signal taking into account the uplink traffic transmission power and the data rate allocated from the BS of the home cell;

wherein the uplink traffic transmission power to be allocated to the MS is determined taking into account a data rate determined to be lower than a ratio of an estimated path loss value for each individual BS and an estimated path loss value to a home BS, received from the MS, to a sum of estimated path loss values to neighbor BSs, and is defined as $$P_0 = \frac{(\gamma_1 L_{10} + L_{11})\gamma_0}{L_{00}L_{11} - \gamma_0\gamma_1 L_{10}L_{01}}\eta$$

$$P_1 = \frac{(\gamma_0 L_{01} + L_{00})\gamma_1}{L_{00}L_{11} - \gamma_0\gamma_1 L_{10}L_{01}}\eta$$

where $\gamma_i$ denotes a carrier-to-interference ratio (CIR) for an MS of an $i^{th}$ BS, $L_{ab}$ denotes a path loss value of an MS located in an $a^{th}$ BS for a $b^{th}$ BS, $P_A$ denotes uplink traffic transmission power for an MS of an $A^{th}$ BS, and $\eta$ denotes thermal noise power.

7. The method of claim 6, wherein the MS receives preamble signals from at least two BSs and estimates path loss values using a power difference between the preamble signals.

8. A system for controlling an uplink traffic load in a wireless mobile communication system having a multi-cell configuration in which a full frequency band is divided into a plurality of sub-frequency bands and a neighbor cell reuses one of the divided sub-frequency bands, the system comprising:

a mobile station (MS) for receiving a reference signal from each of a base station (BS) of a home cell to which the MS belongs and a BS of a neighbor cell, calculating a power difference between the received reference signals to estimate a path loss value for each individual BS, reporting the estimated path loss value to the BS of the home cell, and transmitting an uplink traffic signal taking into account uplink traffic transmission power and a data rate allocated from the BS of the home cell; and a BS for receiving the estimated path loss value for each individual BS from the MS, determining uplink traffic transmission power and a data rate to be allocated to the MS taking the estimated path loss value into consideration, and allocating the determined uplink traffic transmission power and data rate to the MS;

wherein the BS determines the unlink traffic transmission power to be allocated to the MS taking into account a data rate determined to be lower than a ratio of an estimated path loss value for each individual BS and an estimated path loss value to a home BS, received from the MS, to a sum of estimated path loss values to neighbor BSs, and is defined as $$P_0 = \frac{(\gamma_1 L_{10} + L_{11})\gamma_0}{L_{00}L_{11} - \gamma_0\gamma_1 L_{10}L_{01}}\eta$$

-continued $$P_1 = \frac{(\gamma_0 L_{01} + L_{00})\gamma_1}{L_{00}L_{11} - \gamma_0\gamma_1 L_{10}L_{01}}\eta$$

where $\gamma_i$ denotes a carrier-to-interference ratio (CIR) for an MS of an $i^{th}$ BS, $L_{ab}$ denotes a path loss value of an MS located in an $a^{th}$ BS for a $b^{th}$ BS, $P_A$ denotes unlink traffic transmission power for an MS of an $A^{th}$ BS, and $\eta$ denotes thermal noise power.

9. The system of claim 8, wherein the MS receives preamble signals from at least two BSs and estimates path loss values using a power difference between the preamble signals.

10. The system of claim 8, wherein the data rate is defined as $$\gamma_i < \frac{L_{ii}}{\sum_{j \neq i} L_{ij}}$$

where $\gamma_i$ denotes a carrier-to-interference ratio (CIR) for an MS of an $i^{th}$ BS, and $L_{ab}$ denotes a path loss value of an MS located in an $a^{th}$ BS for a $b^{th}$ BS.

11. A method for controlling an uplink traffic load of a mobile station (MS) located in a cell using a Space Division Multiple Access (SDMA) scheme in a wireless mobile communication system having a multi-cell configuration in which a frill frequency band is divided into a plurality of sub-frequency bands, a neighbor cell reuses one of the divided sub-frequency bands, and any one of a plurality of cells uses SDMA, the method comprising the steps of:
receiving, by the MS, a reference signal from each of a base station (BS) of a home cell to which it belongs and a BS of a neighbor cell;
calculating a power difference between the received reference signals to estimate a path loss value for each individual BS, and reporting the estimated path loss value to the BS of the home cell;
receiving, by the BS of the home cell, the estimated path loss value for each individual BS from the MS;
determining uplink traffic transmission power and a data rate to be allocated to the MS taking into account the estimated path loss value and an antenna gain value;
allocating the determined uplink traffic transmission power and data rate to the MS; and
transmitting, by the MS, an uplink traffic signal taking into account the uplink traffic transmission power and the data rate allocated from the BS of the home cell;
wherein the BS determines the data rate according to a ratio of an antenna gain and an estimated path loss value to an MS in the home cell to a sum of estimated path loss values determined taking into account antenna gains to MSs in all neighbor cells, and is defined as $$\gamma_o < p \frac{G_{00}L_{00}}{\sum G_{0x}L_{0x}}$$

$$\gamma_1 < (1-p)\frac{G_{11}L_{10}}{\sum G_{1x}L_{1x}}$$

where $\gamma_i$ denotes a carrier-to-interference ratio (CIR) for an MS of an $i^{th}$ BS, $L_{ab}$ denotes a path loss value of an MS located in an $a^{th}$ BS for a $b^{th}$ BS, p denotes a power weight to be allocated to an MS, and $G_{ij}$ denotes an antenna gain for a $j^{th}$ MS when performing beamforming towards an $i^{th}$ MS.

12. A method for controlling an uplink traffic load by a mobile station (MS) located in a cell using a Space Division Multiple Access (SDMA) scheme in a wireless mobile communication system having a multi-cell configuration in which a frill frequency band is divided into a plurality of sub-frequency bands, a neighbor cell reuses one of the divided sub-frequency bands, and any one of a plurality of cells uses SDMA, the method comprising the steps of:
receiving a reference signal from each of a base station (BS) of a home cell to which the MS belongs and a BS of a neighbor cell;
calculating a power difference between the received reference signals to estimate a path loss value for each individual BS, and reporting the estimated path loss value to the BS of the home cell; and
transmitting an uplink traffic signal taking into account uplink traffic transmission power and a data rate allocated from the BS of the home cell;
wherein the allocated uplink traffic transmission power is determined by $$P_0 = \frac{(\gamma_1 L_{10} + L_{11})\gamma_0}{L_{00}L_{11} - \gamma_0\gamma_1 L_{10}L_{01}}\eta$$

$$P_1 = \frac{(\gamma_0 L_{01} + L_{00})\gamma_1}{L_{00}L_{11} - \gamma_0\gamma_1 L_{10}L_{01}}\eta$$

where $\gamma_i$ denotes a carrier-to-interference ratio (CIR) for an MS of an $i^{th}$ BS, $L_{ab}$ denotes a path loss value of an MS located in an $a^{th}$ BS for a $b^{th}$ BS, p denotes a power weight to be allocated to an MS, and $G_{ij}$ denotes an antenna gain for a $j^{th}$ MS when performing beamforming towards an $i^{th}$ MS.

13. A method for controlling an uplink traffic load by a base station (BS) located in a cell using a Space Division Multiple Access (SDMA) scheme in a wireless mobile communication system having a multi-cell configuration in which a full frequency band is divided into a plurality of sub-frequency bands, a neighbor cell reuses one of the divided sub-frequency bands, and any one of a plurality of cells uses SDMA, the method comprising the steps of:
receiving an estimated path loss value for each individual BS from a mobile station (MS);
determining uplink traffic transmission power and a data rate to be allocated to the MS taking into account the estimated path loss value and an antenna gain value for each individual transmission antenna; and
allocating the determined uplink traffic transmission power and data rate to the MS;
wherein the BS determines the data rate according to a ratio of an antenna gain and an estimated path loss value to an MS in the home cell to a sum of estimated path loss values determined taking into account antenna gains to MSs in all neighbor cells, and is defined as $$\gamma_o < p \frac{G_{00}L_{00}}{\sum G_{0x}L_{0x}}$$

$$\gamma_1 < (1-p)\frac{G_{11}L_{10}}{\sum G_{1x}L_{1x}}$$

where $\gamma_i$ denotes a carrier-to-interference ratio (CIR) for an MS of an $i^{th}$ BS, $L_{ab}$ denotes a path loss value of an MS located in an $a^{th}$ BS for a $b^{th}$ BS, p denotes a power weight to be allocated to an MS, and $G_{ij}$ denotes an antenna gain for a $j^{th}$ MS when performing beamforming towards an $i^{th}$ MS.

14. The method of claim 13, wherein the received estimated path loss value is determined using a power difference between preambles received from a BS of a home cell to which the MS belongs and a BS of a neighbor cell.

15. A system for controlling an uplink traffic load in a wireless mobile communication system having a multi-cell configuration in which a full frequency band is divided into a plurality of sub-frequency bands, a neighbor cell reuses one of the divided sub-frequency bands, and any one of a plurality of cells uses a Space Division Multiple Access (SDMA) scheme, the system comprising:
  a mobile station (MS) for receiving a reference signal from each of a base station (BS) of a home cell to which the MS belongs and a BS of a neighbor cell, calculating a power difference between the received reference signals to estimate a path loss value for each individual BS, reporting the estimated path loss value to the BS of the home cell, and transmitting an uplink traffic signal taking into account uplink traffic transmission power and a data rate allocated from the BS of the home cell; and
  a BS for receiving the estimated path loss value for each individual BS from the MS, determining uplink traffic transmission power and a data rate to be allocated to the MS taking into account the estimated path loss value and an antenna gain value for each individual transmission antenna, and allocating the determined uplink traffic transmission power and data rate to the MS;
  wherein the BS determines the data rate according to a ratio of an antenna gain and an estimated path loss value to an MS in the home cell to a sum of estimated path loss values determined taking into account antenna gains to MSs in all neighbor cells, and is defined as $$P_0 = \frac{(\gamma_1 L_{10} + L_{11})\gamma_0}{L_{00}L_{11} - \gamma_0\gamma_1 L_{10}L_{01}}\eta$$

$$P_1 = \frac{(\gamma_0 L_{01} + L_{00})\gamma_1}{L_{00}L_{11} - \gamma_0\gamma_1 L_{10}L_{01}}\eta$$

where $\gamma_i$ denotes a carrier-to-interference ratio (CIR) for an MS of an $i^{th}$ BS, $L_{ab}$ denotes a path loss value of an MS located in an $a^{th}$ BS for a $b^{th}$ BS, p denotes a power weight to be allocated to an MS, and $G_{ij}$ denotes an antenna gain for a $j^{th}$ MS when performing beamforming towards an $i^{th}$ MS.

* * * * *

UNITED STATES PATENT AND TRADEMARK OFFICE
CERTIFICATE OF CORRECTION

PATENT NO. : 7,609,661 B2 Page 1 of 1
APPLICATION NO. : 11/356821
DATED : October 27, 2009
INVENTOR(S) : Chae et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 829 days.

Signed and Sealed this

Twelfth Day of October, 2010

David J. Kappos
*Director of the United States Patent and Trademark Office*